April 28, 1959 D. C. STRAIN ET AL 2,884,505
VARIABLE CONTROL FOR ELECTRICAL IMPEDANCE ASSEMBLIES
Filed Jan. 10, 1956 3 Sheets-Sheet 1
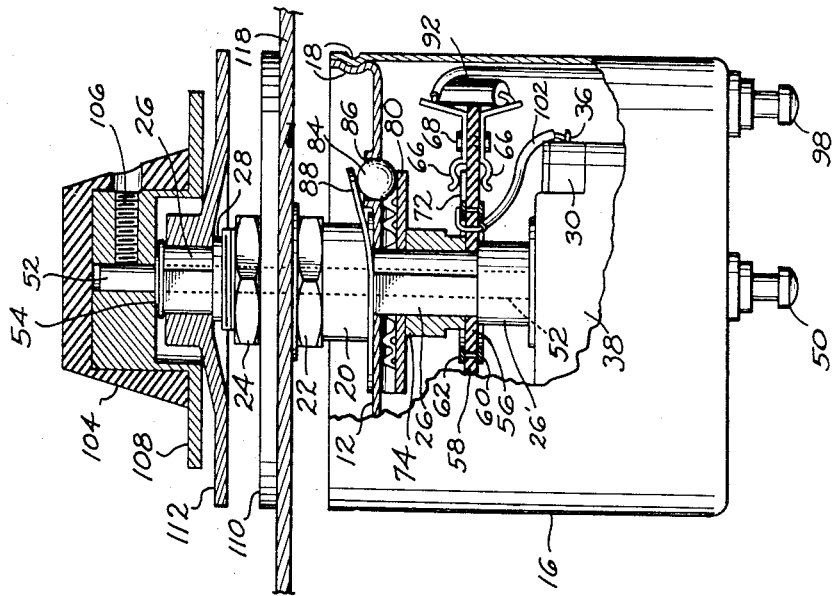
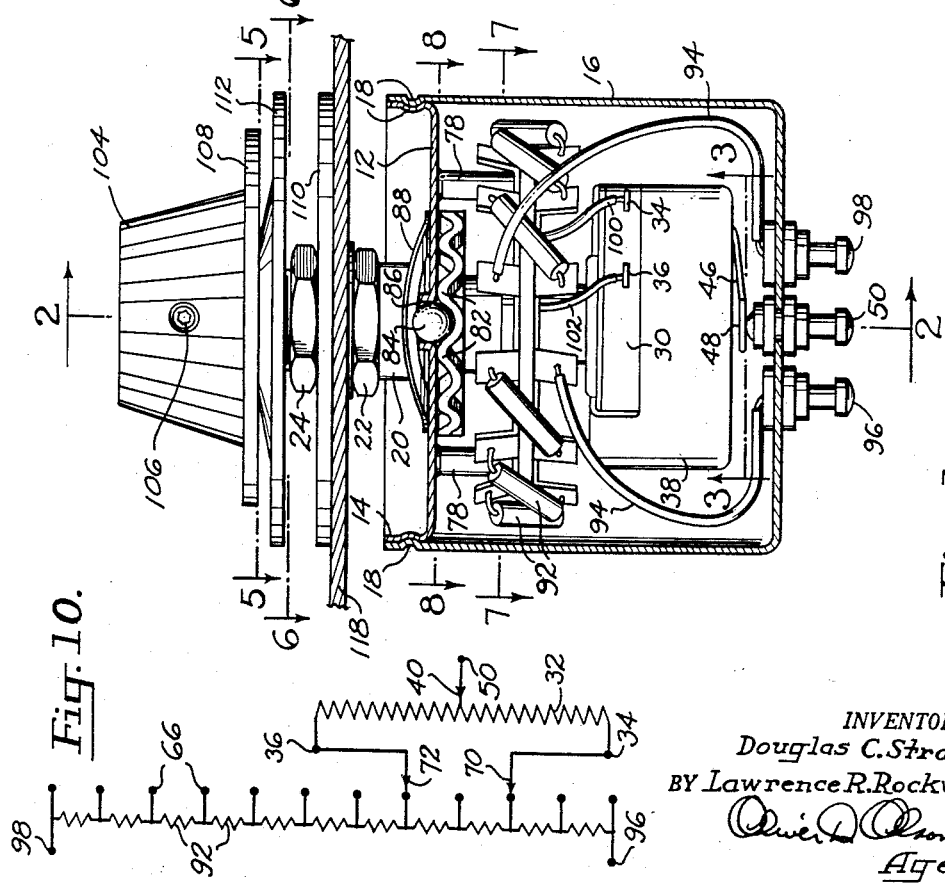
INVENTORS
Douglas C. Strain
BY Lawrence R. Rockwood
Agent April 28, 1959  D. C. STRAIN ET AL  2,884,505
VARIABLE CONTROL FOR ELECTRICAL IMPEDANCE ASSEMBLIES
Filed Jan. 10, 1956  3 Sheets-Sheet 2

INVENTORS
Douglas C. Strain
BY Lawrence R. Rockwood

Agent

April 28, 1959  D. C. STRAIN ET AL  2,884,505
VARIABLE CONTROL FOR ELECTRICAL IMPEDANCE ASSEMBLIES
Filed Jan. 10, 1956  3 Sheets-Sheet 3
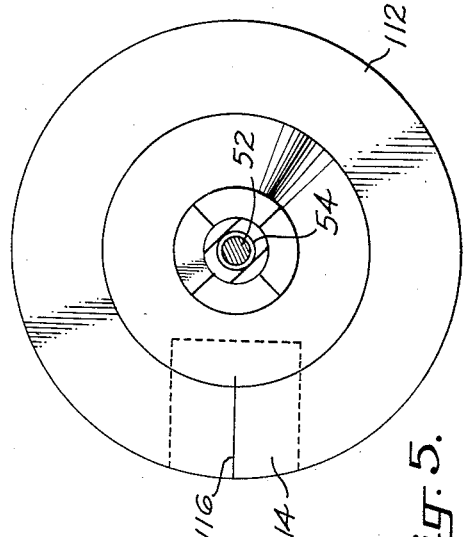
Fig. 5.
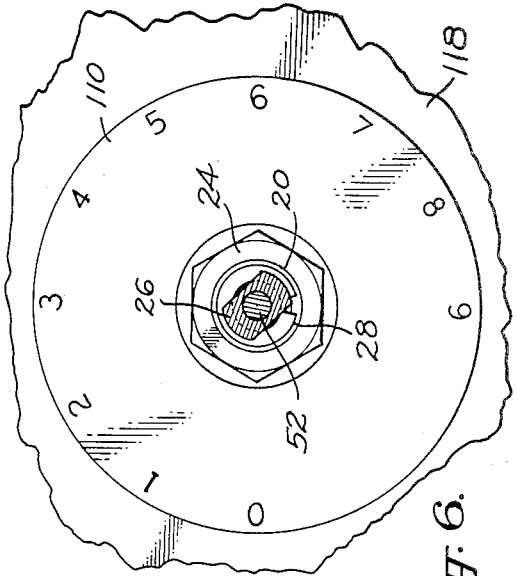
Fig. 6.
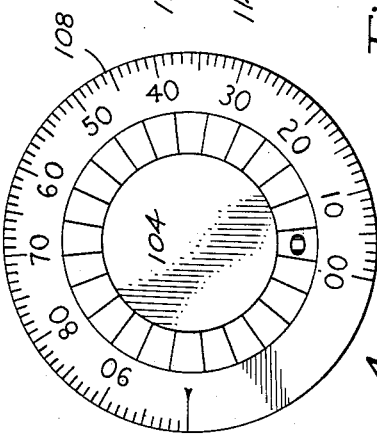
Fig. 4.
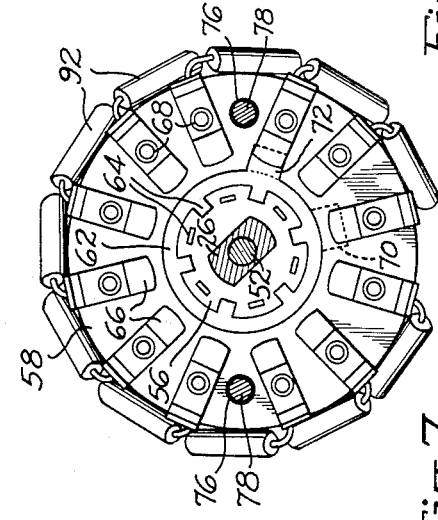
Fig. 7.
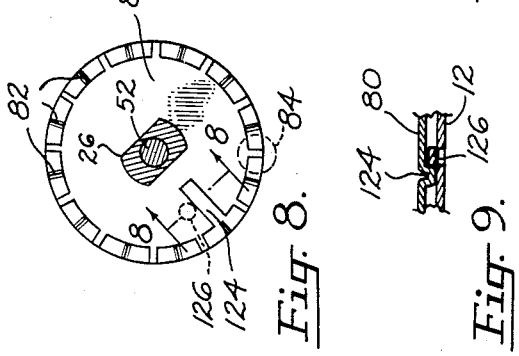
Fig. 8.  Fig. 9.
INVENTORS
Douglas C. Strain
BY Lawrence R. Rockwood
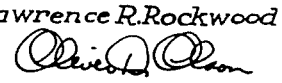
Agent

United States Patent Office

2,884,505
Patented Apr. 28, 1959

2,884,505

VARIABLE CONTROL FOR ELECTRICAL IMPEDANCE ASSEMBLIES

Douglas C. Strain, Portland, and Lawrence R. Rockwood, Oswego, Oreg., assignors to Electro-Measurements, Inc., Portland, Oreg., a corporation of Oregon Application January 10, 1956, Serial No. 558,210

15 Claims. (Cl. 201—48)

This invention pertains to electric switches, and relates particularly to novel mechanical means for supporting and operating multistage electrical impedance assemblies, such as voltage dividers, rheostats, and the like.

It is a principal object of this invention to provide a variable control for electrical impedance assemblies in which the values of impedance may be selected from a single control.

Another important object of the present invention is to provide a variable control for electrical impedance assemblies, which control is extremely compact in arrangement and yet affords maximum heat dissipation for impedance elements, thereby providing for maximum wattage utilization in a minimum of space.

A further important object of this invention is the provision of a variable control for voltage dividers, rheostats, and the like, which control accommodates use of any type of impedance element desired.

A still further important object of this invention is the provision of a variable control for electrical impedance assemblies, which control accommodates the use of fixed impedance elements, thereby allowing individual impedance elements to be replaced in the event of damage or burnout.

Still another important but specific object of the present invention is the provision of a variable control for voltage dividers, rheostats, and the like, which control accommodates the use of fixed resistances, thereby affording maximum frequency response and linearity, and permitting prestabilization of the said resistances to insure maximum accuracy over a long operation period.

Still another object of the present invention is to provide a variable multistage switch control assembly which is of simplified construction for economical manufacture, which requires but a single hole for mounting on a panel, and which is operated with maximum facility and precision.

A further important object of this invention is to provide a multistage switch control which is of simplified construction and minimum size, which is versatile in use and operation, and which affords a practical degree of accuracy with a minimum of cost.

The foregoing and other objects and advantages will appear from the following detailed description, taken in connection with the accompanying drawings, in which:

Figure 1 is a view in side elevation, partly in section, of a variable switch control embodying the features of the present invention, the same being illustrated in combination with the voltage divider circuit of Figure 10;

Figure 2 is a sectional view taken along the line 2—2 in Figure 1, disclosing details of internal construction;

Figure 4 is a plan view, as viewed from the top in Figure 1, showing the single control knob and interpolating impedance dial;

Figure 5 is a sectional view taken along the line 5—5 in Figure 1, and showing a preferred construction of the index plate forming a part of the voltage divider construction;

Figure 6 is a fragmentary sectional view taken along the line 6—6 in Figure 1, and showing the dial arrangement associated with the fixed impedance elements of the voltage divider;

Figure 7 is a sectional view taken along the line 7—7 in Figure 1, showing the switch assembly for the fixed impedance elements;

Figure 8 is a sectional view taken along the line 8—8 in Figure 1, showing the drive connection between the interpolating impedance assembly and the fixed impedance switch assembly;

Figure 9 is a fragmentary sectional view taken along the line 9—9 in Figure 8;

Figure 10 is a schematic diagram showing the electrical circuit of the voltage divider assembly illustrated in Figure 1;

Figure 3:
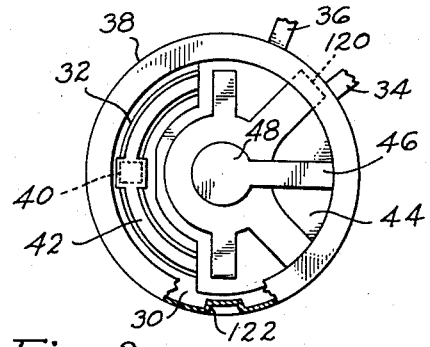
Figure 3 is an end view, as viewed from the bottom in Figure 2, showing the drive mechanism associated with the interpolating resistance unit of the voltage divider.

Referring particularly to Figures 1 and 2 of the drawings, the mechanical assembly illustrated is designed particularly to accommodate the type of voltage divider circuit shown in Figure 10. The mechanical assembly includes a supporting plate 12 which, in the embodiment illustrated, is circular in form and is provided with an outwardly extending peripheral wall 14. This wall is adapted frictionally to engage the inner surface of the enclosing cover 16. Complimentary indentations 18, provided at spaced intervals along the circumference of the wall 14 and cover 16, respectively, insures against displacement of said parts.

Projecting outwardly from the center of plate 12 and forming a part thereof is an elongated bearing post 20, the terminal portion of which is provided with external threads adapted to receive the locking nuts 22, 24. The bearing post and plate are provided with a longitudinal central bore which is adapted to receive slidably therethrough, for axial rotation, the elongated hollow outer shaft 26.

The outer shaft 26 is secured against longitudinal displacement with respect to the projecting post 20 by means of the ring-shaped keeper 28 which is removably received within an annular groove formed in the outer shaft adjacent the outer end of the post.

The inner end of the outer shaft 26 is secured firmly to the electrically non-conducting body 30 carrying the interpolating resistance element 32. In the embodiment illustrated, this resistance element is of the single turn molded composition type. The resistance element is provided with spaced end terminals 34 and 36. The body of the interpolating resistance supports a cylindrical shield 38 which extends inwardly therefrom and is open at its inner end.

A rotary contact 40 is arranged to engage the interpolating resistance, and is mounted upon a contact arm 42 (Figure 3) which is secured to an electrically non-conducting base 44. The contact arm is connected electrically through a resilient conductor 46 to a terminal contact 48. This terminal contact projects from the shield 38 for resilient contact with the binding post 50 supported on the inner end of the cover 16.

The electrically non-conducting base 44 is secured firmly to the inner end of the elongated inner shaft 52, which extends through the longitudinal bore in the first mentioned outer shaft 26. The inner shaft is longer than the outer shaft and projects outwardly therefrom, as best shown in Figure 2. A keeper ring 54 is secured within an annular groove formed in the inner shaft adjacent the outer end of the outer shaft to prevent longitudinal displacement of the inner shaft with respect to the outer shaft.

The outer shaft 26 is provided with an enlarged section 26' adjacent the potentiometer body 30. This enlarged section provides a shoulder which functions as an abutment for positioning the rotary section 56 of a conventional wafer type switch assembly. As best shown in Figure 7 of the drawings, this rotary section is provided with a central opening of non-circular shape, and hence the outer shaft 26 is provided with a corresponding cross-sectional shape, outwardly from the enlarged section 26'.

The wafer switch also includes an outer section 58 disposed concentrically about the inner rotary section. The two sections of the wafer switch are held together for relative axial rotation by means of collector rings 60 and 62 which are secured to opposite sides of the rotary section by means of fingers 64 (Figure 7) which extend through openings in the rotary section. The collector rings are separated electrically from each other.

Secured to the outer section 58 of the wafer switch, and arranged on the opposite faces thereof in circumferentially spaced pairs, are a plurality of contact elements 66. The contact elements of each pair are connected together electrically by means of the rivet connection 68 which secures the elements to the outer switch section. The contact elements mounted on one face are disposed for selective engagement with contact brush 70 which projects radially outward from collector ring 60. In similar manner, the contact elements mounted on the opposite face of the outer section are positioned for selective engagement with brush 72 which projects radially outward from collector ring 62.

As best shown in Figure 7 of the drawings, the brushes 70 and 72 are disposed circumferentially in such manner as to make simultaneous contact with alternate contact elements, i.e. with two contact elements positioned on opposite sides of a third contact element. The purpose for this arrangement is explained in detail hereinafter.

A spacer element 74 is supported slidably on the outer shaft 26, in abutment with the inner rotary section 56 of the wafer switch. The spacer element functions to separate the wafer switch from a detent mechanism which functions to position the brushes 70, 72 selectively in proper alignment with the contact elements 66.

The outer section 58 of the wafer switch is provided with diammetrically spaced holes 76 (Figure 7) to receive freely therein the pins 78 which extend inwardly from the base plate 12. In this manner the outer section of the switch is held against axial rotation with respect to the plate 12, but is permitted a degree of longitudinal movement with respect to shaft 26.

In the embodiment illustrated and best shown in Figures 2 and 8, the detent mechanism includes a circular plate 80 having a central opening contoured to the non-circular cross sectional shape of the outer shaft 26. The plate is scalloped adjacent its periphery, providing a plurality of circumferentially spaced projections 82. The depression between adjacent projections is adapted to receive a ball detent 84 which is mounted in an opening 86 in the base plate 12. A resilient ring 88 is secured to the outer surface of the base plate 12, concentrically about the projecting post 20, for resilient engagement with the ball detent, whereby to urge the latter inwardly into the depression between the adjacent projections 82.

The mechanical assembly illustrated in the drawing is designed to accommodate the voltage divider circuit shown in Figure 10, wherein a plurality of fixed resistance elements 92 are adapted to be connected between adjacent contact elements 66 to form a series-connected chain. The opposite ends of the series chain are connected through electrical conductors 94 to the binding posts 96 and 98, respectively, mounted in the rear end of cover 16. The end terminals 34 and 36 of the potentiometer resistance 32 are connected through electrical conductors 100 and 102 to the electrically separated collector rings 60 and 62, respectively. Thus, it will be apparent that the spaced contact brushes 70 and 72 may be moved selectively into engagement with alternate contacts 66 as the outer shaft 26 is rotated stepwise through the positions established by the detent mechanism.

A control knob 104 is mounted removably upon the outer end of the inner shaft 52, as by means of the set screw 106. A radially extending dial 108 is secured or otherwise formed integral with the control knob, and carries upon its exposed face calibrations which, as shown in Figure 4 of the drawings, preferably are numbered from zero to 100. The control knob functions to rotate the potentiometer contact 40, and the calibrated dial indicates the positions of rotation.

A second dial plate 110 is secured to the post 20. As shown in Figure 6 of the drawings, this dial plate is provided with circumferentially spaced dial markings from zero to nine, and these markings identify the positions of the spaced contact brushes 70, 72 along the series chain of resistance elements 92. However, this dial does not rotate with the outer shaft 26, and hence an index plate 112 is provided to identify the position of rotation of the outer shaft and said brushes. This index plate is secured to the outer end of the outer shaft 26, and is positioned between the dial plates 108 and 110. The index plate preferably is constructed of synthetic plastic material which is transparent. A major portion of the index plate is painted or otherwise rendered opaque, leaving a small transparent window 114 through which the numerals on dial plate 110 are visible. An index line 116 may be provided on the transparent window to assist in correlating the calibrations on dial 108 with the numerals on dial 112.

Referring particularly to Figures 1 and 2 of the drawings, it is to be noted that the voltage divider is shown mounted on an instrument panel 118, such as the top panel of an instrument with which the voltage divider is to be used. This mounting is effected simply by providing a single hole through the instrument panel. With dials 108, 110 and 112 removed, the post 20 is slipped through said hole, dial 110 is placed upon the panel and lock nut 24 is secured in place. Dials 112 and 108 then may be secured to the outer and inner shafts 26 and 52, respectively.

It will be observed that the outer shaft 26 may be rotated by gripping the peripheral edge of index plate 112 with the fingers and rotating the same. However, means is provided for rotating the outer shaft, and hence the rotary section 56 of the wafer switch, by means of the single control knob 104. Referring to Figure 3 of the drawings, it is to be noted that the electrically non-conducting base 44 for the potentiometer contact arm 42 carries a projection 120 which is positioned for abutment with the indentation 122 formed in the shield 38. This abutment is made at the extreme ends of rotation of the contact 40, and it effectively forms an abutment between the inner and outer shafts. Thus, further rotation of the control knob 104, while the projection 120 is in abutment with the indentation 122, causes the shield 38 and the attached outer shaft 26 to rotate therewith. In this manner, the inner rotary section 56 of the wafer switch is caused to rotate, changing the positions of the spaced contact brushes 70, 72 with respect to the contact elements 66. This rotation of the outer shaft is accompanied by simultaneous rotation of the detent plate 80, with the detent ball 84 moving through the opening 86 in the base plate 12 against the resistance of the detent spring 88.

By means of the foregoing arrangement there is made possible the operation of the potentiometer contact 40 and the spaced contact brushes 70, 72 of the wafer switch assembly from the single control knob 104. That is to say, for any given setting of the spaced contact brushes, selecting the resistance value of the series chain of fixed resistances 92, the interpolating potentiometer resistance 32 may be traversed from end to end without disturbing the position of the brushes. In the event that the position of the brushes is to be changed, to select a higher or lower value of fixed resistance, the control knob 104 is rotated to bring the projection 120 into abutment with the appropriate end of the indentation 122 on the potentiometer cover, whereupon further rotation of the control knob causes rotation of the inner rotary section 56 of the wafer switch.

Means may be provided to prevent continuous rotation of the inner rotary section 56 of the wafer switch, in the event it is desired to restrict the contact brushes to rotation between the terminal end of the series chain of resistances 92. Such means is illustrated in Figures 8 and 9, wherein the detent plate 80 is provided with an outwardly struck segment 124 and the base plate 12 is provided with an inwardly struck segment 126. These segments form abutments which are arranged for mutual contact at the opposite limits of rotation of the outer shaft 26. Thus, the spaced brushes 70, 72 may only traverse the contacts 66 between the ends of the resistance chain connected between the terminals 96, 98.

As illustrated in Figures 4 and 6, the operating dials are calibrated to give a direct indication of the decimal fraction of voltage output. It is understood that the input terminals are identified by the reference numerals 96 and 98, and the output terminals by reference numerals 98 and 50. In the illustrated arrangement, the readings are taken along the index line 116.

A typical circuit construction of the voltage divider illustrated in the drawing is as follows: Each of the eleven fixed resistances 92 is 1000 ohms, and the interpolating potentiometer resistance 32 is 2000 ohms. Thus, it is seen that the maximum value of the interpolating resistance is equal to the resistance of any pair 92 with which it is in parallel. The constant input resistance of the circuit, between terminals 96 and 98, is 10,000 ohms.

The structure of the present invention accommodates various modifications in the electrical circuitry associated therewith. For example, in the foregoing exemplified construction of the circuit shown in Figure 10, the dial 108 is employed to interpolate between adjacent numbers on the dial 110. If desired, an arrangement may be provided in which the dial 108 is calibrated in three successive groups of ten numbers, to increase the range of dial calibration by a factor of three. Such an arrangement is advantageous, for example, when the voltage divider is used to record rapidly fluctuating voltages, for the dial 108 thereby has a range encompassing, and thus is capable of interpolating between, three units on the dial 110. By this arrangement the operator does not have to switch to different positions on dial 110 to cover the range.

To provide the dial 108 with a scale expanded by the foregoing factor of three, whereby to interpolate through three of the fixed resistances 92, the electrical circuit shown in Figure 10 is modified as follows: The contact brushes 70, 72 are spaced apart sufficiently so that four of the fixed resistances 92 are included between said brushes. The value of the interpolating resistance 32 also is changed in accordance with the equation.

$$R_s = R\left(\frac{nm}{n-m}\right)$$

wherein $R_s$ is the value of the shunting resistance 32, R is the value of each of the fixed resistances 92, $n$ is the number of fixed resistances 92 shunted and $m$ is the number of fixed resistances 92 through which it is desired to interploate. Using the values exemplified hereinbefore, wherein the resistances 92 are each 1000 ohms, the value of $R_s$ for the expanded dial is calculated to be 12,000 ohms, with four of the resistances 92 shunted thereby.

In order to provide more rapid control of a slightly varying voltage, it is preferred that the potentiometer resistance 32 be increased in value by a fraction of an integer, for example, by ten percent. This expansion permits the operator to follow a slightly varying voltage across the value at which he would normally have to change the setting of the interconnected potentiometer body 30 and the rotary section 56 of the wafer switch. This arrangement affords rapid control and eliminates switching transients and voltage surges. It will be understood, therefore, that the foregoing equation establishes the minimum value of the inerpolating resistance 32 for a given assembly, but that the interpolating resistance may be increased if desired, for the purposes explained above.

Figure 11:
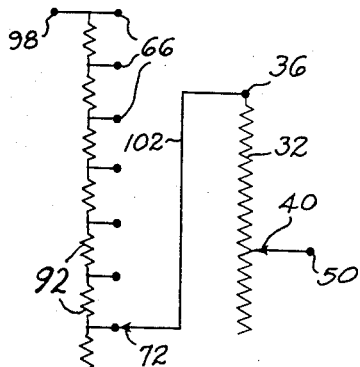
Figure 11 is a schematic diagram showing the electrical circuit of a rheostat which may be incorporated with the mechanical assembly of the present invention.

Referring now to Figure 11 of the drawings, there is shown a schematic diagram of an electric circuit forming a rheostat construction. The mechanical assembly illustrated and described hereinbefore is sufficiently versatile to accommodate the formation of the rheostat circuit. Thus, for example, the ten fixed resistances 92 may be connected together in series and supported on the outer section 56 of the wafer switch by connection to adjacent contact elements 66, as indicated. One end only of the series chain is connected through conductor 94 to terminal 98.

Only one of the contact brushes 70, 72 is used in the rheostat assembly illustrated. In the illustration, contact brush 72 is employed to make contact with adjacent contacts 66, and is connected to one end 36 of the potentiometer resistance 32 through conductor 102. The opposite end of the potentiometer resistance remains free.

In the embodiment described hereinbefore, the mechanical construction of the switch accommodates the assembly of a two-stage voltage divider or rheostat. Additional stages may be provided by additional wafer switches and detent assemblies, as will be apparent. A three-stage assembly is illustrated in Figures 12, 13 and 14, which also show a modified form of construction of the mechanical assembly.

Figure 12:
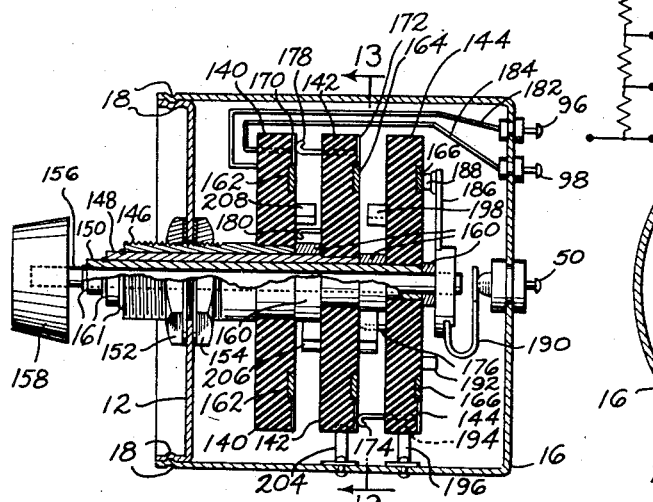
Figure 12 is a sectional view showing a modified form of switch construction embodying features of the present invention; the same being illustrated in combination with the three stage voltage divider circuit of Figure 14.
Figure 13:
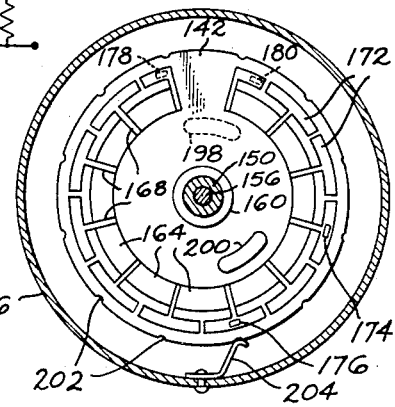
Figure 13 is a sectional view taken along the line 13—13 in Figure 12.
Figure 14:
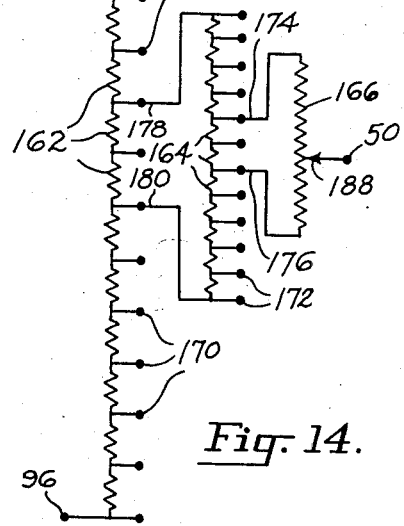
Figure 14 is a schematic diagram showing the electrical circuit of the three stage voltage divider assembly illustrated in Figure 12.

In the modification of Figures 12–14, three switch bodies 140, 142 and 144 are contained within housing 16 in longitudinally spaced relation, and connected, respectively, to the concentric hollow shafts 146, 148 and 150. The outermost shaft 146 is provided with a threaded section which extends through a central opening in the base plate 12, and is secured thereto by means of the attaching nuts 152, 154 which are placed on opposite sides of the base plate. A central shaft 156 extends through the innermost hollow shaft and carries at its outer end a control knob 158. The concentric shafts thus are mounted for relative axial rotation and are constrained against longitudinal displacement by such means as the spacer sleeves 160 mounted freely on the shafts between the switch elements 140, 142, 144 and 186, and the keeper rings 161 which are mounted in annular grooves formed in each shaft adjacent the outer ends of the next outer shaft.

The switch bodies are constructed of electrically nonconductive material. Imbedded in or otherwise mounted on the inwardly facing surface of each switch body, in the form of an open circle, is a deposit of electrical resistance material, such as carbon or metallic resistive film. Thus, the open rings of resistance material provided in the switch bodies 140, 142, 144 are indicated by the reference numerals 162, 164, 166, respectively.

Each of the open rings 162 and 164 of resistance material is divided into segments by circumferentially spaced radial strips 168 of electrically conducting material. The electrically conducting separating strips 168 function to divide the resistance rings into a plurality of individual resistances connected together in series. These resistances function in the same manner as the fixed resistances 92 described hereinbefore. Each strip is connected to an arcuate contact mounted on the switch body a spaced distance outwardly from the resistance ring. Thus, contacts 170 are associated with resistance ring 162 and contacts 172 are associated with resistance ring 164. Resistance ring 166 is not segmented.

The terminal ends of each resistance ring are connected to brush contacts which are secured to the associated switch body and project from the side of the latter opposite the resistance ring. Thus, brush contacts 174 and 176 are connected to the terminal ends of resistance ring 166 and project from the switch body 144 toward the intermediate switch body 142. Similarly, brush contacts 178 and 180 are connected to the terminal ends of resistance ring 164 and extend through the switch body 142 toward the fixed switch body 140.

The spaced brushes 174, 176 and 178, 180 extend into sliding abutment with the segment contacts 172 and 170, respectively, on switch bodies 142 and 140, respectively. As best illustrated in Figure 13, the spaced brushes of each pair, for example 174, 176, are separated circumferentially a distance appropriate to engage alternate contacts 172, in the manner and for the purpose described hereinbefore in connection with the spaced brush contacts 70, 72.

The terminal ends of the segmented resistance ring 162 provided on the fixed switch body 140 are connected through conductor 182 and 184 to the terminal posts 96 and 98, respectively, mounted on the inner face of the housing 16.

The resistance ring 166 provided on the innermost switch body 144 preferably is not segmented, i.e. it is resistance element similar to the interpolating resistance element 32 described hereinbefore.

The contact arm 186 connected to the inner end of the innermost shaft 156 supports an electric contact 188 which is connected electrically through the conducting resilient spring 190 to the central terminal post 50, in the manner explained hereinbefore.

A stop member 192 projects from the face of switch body 146 to intercept the path of rotation of the contact arm 186, whereupon continued rotation of the shaft 156 causes simultaneous rotation of the switch body 144. Stepwise rotation of this body is provided by detent means which, in the embodiment illustrated, comprises a plurality of circumferenitally spaced indentations 194 formed in the circumferential surface of the body 144. A resilient detent spring 196 is secured at one end to the housing 16 and its opposite end is positioned to be received slidably within the indentations 194 as the body 144 is rotated.

A stop member 198 also projects from the opposite face of switch body 144 for engagement with the abutment 200 projecting from the adjacent face of switch body 142, whereupon continued rotation of the switch body 144 causes simultaneous rotation of the intermediate switch body 142. A plurality of indentations 202 are provided at spaced intervals along the circumference of the switch body 142 for reception of the resilient spring detent 204 which is secured to the housing 16.

An abutment 206 also projects from the opposite face of switch body 142 for engagement with abutment 208 projecting from the inner face of the fixed switch body 140. Upon such abutment, further rotation of the preceding switch bodies 142 and 144 is prevented, and thus the switch assembly has reached one of its limits of rotation. It will be understood, of course, that rotation of the switch bodies 142 and 144 and the contact arm 186 may be reversed, to bring the switch assembly to its other limit of rotation.

The mechanical assembly shown in Figure 12 is adapted to provide a three-stage voltage divider, such as is illustrated schematically in Figure 14. The continuous open-ring resistance element 166 functions as an interpolating potentiometer in shunt with adjacent pairs of resistance elements 164 formed by the conducting strips 168. This latter series connected chain is arranged in shunt with adjacent pairs of resistance elements 162 of the final series chain circuit.

A typical circuit construction of the voltage divider illustrated in Figure 14 is as follows: Interpolating resistance 166 is 400 ohms; each of the 11 fixed resistances 164 is 200 ohms; and each of the 11 fixed resistances 162 is 1000 ohms. Thus, it is seen that the 400 ohms of interpolating resistance is equal to the resistance of any pair 164 with which it is in parallel. Further, the maximum resistance of 2000 ohms in the series 164, as shunted by resistance 166, is equal to the resistance of any pair 162 with which it is in parallel. The constant input resistance of the circuit, between terminals 96 and 98, is 10,000 ohms.

It will be observed that the equation set forth hereinbefore is applicable to determine the values of the shunting resistances 166 and 164 for any desired expansion ratio.

It will be recognized by those skilled in the art that the mechanical assembly illustrated in Figure 12 may also be employed in the formation of a three-stage rheostat, in manner similar to the arrangement described hereinbefore.

The various multistage switch assemblies illustrated and described hereinbefore also may be used advantageously without impedance elements. In such instances the assemblies perform switching operations by selective engagement and disengagement of associated switch contacts for selectively controlling a plurality of electrical circuits. Such uses are found, for example, in various types of test equipment, such as range and multiplier selectors and in the control of computer function generators.

Figure 15:
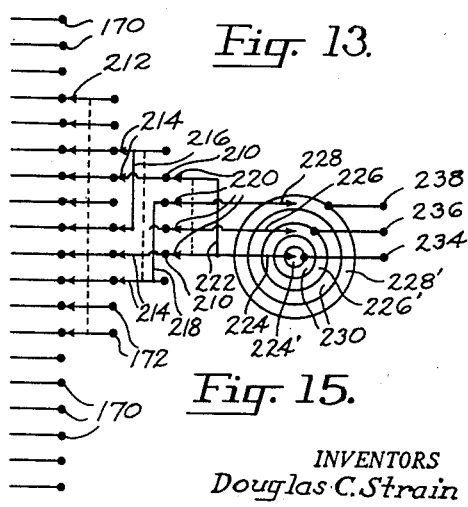
Figure 15 is a schematic diagram showing the electrical circuit of a three stage switch assembly which may be used with the mechanical assembly shown in Figure 12.

Referring to Figure 15 of the drawings, the switch assembly shown in Figure 12 is modified to accommodate a switching circuit which is similar to the circuit shown in Figure 14 with the exception that the impedance elements are omitted. Thus, there is provided on the switch body 140 a plurality of spaced switch contacts 170, and on the switch body 142 a plurality of spaced switch contacts 172. The switch body 144 carries a plurality of spaced switch contacts 210 in place of the potentiometer resistance 166.

Brush contacts 212 project from the body 142 for selective engagement with the spaced contacts 170 and are connected electrically to the contacts 172, in manner similar to the arrangement of the brush contacts 178, 180 in Figure 12. Similarly, brush contacts 214 are carried by the switch body 144 for selective engagement with the spaced contacts 172 and are connected electrically to the spaced contacts 210, in manner similar to the arrangement of the brush contacts 174, 176.

As illustrated in Figure 15, the electrical connections between associated contacts and brush contacts may be made in any pattern desired. This is illustrated, for example, by the electrical connections 216 and 218 between the contacts 210 and the brush contacts 214. Similar predetermined connections may be made between the contacts 172 and the brush contacts 212, as will be apparent.

The contact arm 186 (Figure 12) may carry a plurality of spaced brush contacts 220 which are electrically insulated from each other and arranged for selective engagement with the spaced contacts 210. Two or more of these brush contacts 220 may be connected together, if desired, as indicated by the electrical conductor 222. The brush contacts 220 are connected through resilient conductors 224, 226, 228, which make sliding contact with the concentric collector rings 224', 226', and 228', respectively. These rings are illustrated in Figure 15 as being separated electrically by the spaces 230. Each of these rings is connected electrically to a binding post mounted on the rearward end of the housing 16. Thus, the binding posts 234, 236 and 238 are connected to the collector rings 224', 226' and 228', respectively.

There are many inherent advantages in the multistage switch constructions of the present invention: The mechanical assemblies provided by the present invention are sufficiently versatile to accommodate various arrangements of electrical elements, such as the formation of voltage dividers, rheostats, and switch combinations, as described hereinbefore. Complete operation of these various assemblies is afforded by manipulation of a single control knob.

When employed to provide resistance assemblies, the use of the fixed resistances 92 enhances the frequency response of the system, as compared with conventional potentiometer type instruments, by reducing the shunt capacitance and series inductance substantially below the value characterizing the latter type. The fixed resistances may be of any type and may be stabilized before being installed in the device. The interpolating resistance 32 is but a small fraction of the complete circuit, and therefore the effect of its lesser accuracy is decreased proportionately. This resistance may be made of heavier wire which contributes to longer operating life.

Greater acuracy and linearity is achieved in the voltage divider constructions of this invention. The zero resistance is greatly reduced by use of fixed resistances. The deleterious effect of small variations in switch contact resistance is reduced considerably by the fact that such resistances are associated only with a large resistance which is in parallel with a small fraction of the main resistances. Since the accuracy of the resistances increases from the interpolating resistance through the fixed resistances, the effects of the lesser accuracies in the preceding resistance is greatly reduced by the fact that it is arranged in parallel with more accurate resistances.

The resistance assemblies employing the construction illustrated in Figure 12 are characterized by ease and economy of fabrication. By forming the several resistances from a single uniform strip, they all have similar coefficients of temperature and therefore linearity is maintained. The systems also are characterized by excellent frequency response.

The mechanical arrangement of resistance elements operated by coaxial shafts from a single control knob provides a construction which is very compact and yet highly efficient in the dissipation of heat. No "pigtail" leads are required, since connection between the two switch asemblies is made through the sections which are secured to the same rotary shaft 26.

The mechanical arrangement provides rapid and accurate assembly, thereby minimizing the cost of manufacture. In this regard, it is to be noted that the entire mechanical assembly contained within the cover 16 is held together in proper operative relationship only by the two keeper rings 28 and 54. The removal of keeper ring 54 releases the inner shaft 52 and the attached potentiometer contact arm 42. The removal of keeper ring 28 affords immediate disassembly of the detent mechanism, the spacer sleeve 74 and the wafer switch assembly to facilitate rapid interchange of elements.

It will be apparent to those skilled in the art that various changes may be made in the structural details described hereinbefore without departing from the scope and spirit of this invention. For example, although the interpolating resistance 32 is illustrated herein as being a continuous resistance engaged by contact 40 on rotary arm 42, it will be apparent that a series arrangement of fixed resistances may be employed in lieu thereof. In such a case each resistance may be connected between spaced contacts of a rotary switch having an engageable contact arm, in manner similar to the switch arrangement 56, 58 described hereinbefore. Since the potentiometer 32 may be considered as comprising an infinite number of individual resistances over the range of the latter, connected between adjacent contacts engageable by contact 40, the recitation in the appended claims of a plurality of impedance means connected in series between spaced contacts is intended to include the conventional continuous potentiometer arrangement. It is to be understood further that the term interpolating impedance means, as employed in the claims, identifies the last impedance unit in a given combination.

It will be further apparent that the rotary switches and operating shaft described hereinbefore may be replaced by elements which move longitudinally rather than rotatively. The number of stages of switch units may be increased from the two and three stage assemblies illustrated, by adding units similar to the intermediate unit shown in Figure 12. The operating shaft may be power driven, if desired, or manipulated manually as described hereinbefore.

Although the mechanical assemblies of the present invention have been illustrated hereinbefore in connection with resistance elements, it will be apparent that any type of impedance element may be utilized therewith. Thus, for example, the resistance elements may be replaced by elements which provide capacitive or inductive impedance, and the terms impedance element as recited in the appended claims is intended to include such elements. Accordingly, in arrangements providing voltage divider constructions, the equation set forth hereinbefore may be generalized as follows:

$$Z_s = Z\left(\frac{nm}{n-m}\right)$$

wherein $Z_s$ is the value of shunting impedance, $Z$ is the value of each of the impedances shunted, $n$ is the number of fixed impedances shunted, and $m$ is the number of fixed impedances through which it is desired to interpolate.

The foregoing and other changes may be made without departing from the scope and spirit of the present invention. Accordingly, it is to be understood that the detailed description presented herein is merely illustrative of the invention and is not to be construed as limiting the scope thereof.

Having now described our invention and the manner in which the same may be used, what we claim as new and desire to secure by Letters Patent is:

1. A multistage switch device comprising: a support, first switch means including a pair of relatively movable sections, first contact means mounted on one section of the switch means, contact means mounted on the other section of the first switch means for selective engagement with the contact means on said one section of the first switch means, operating means mounted for movement relative to the support and connected to one section of the first switch means, means releasably interengaging the pair of sections of the first switch means for maintaining said sections in relative fixed position after a predetermined movement of the section connected to the operating means, second switch means including a section mounted independently of the relative movement of the sections of the first switch means, contact means mounted on said independently mounted section of the second switch means, contact means mounted for movement with the said one section of the first switch means and arranged for selective engagement with the said contact means on the independently mounted section of the second switch means, and conductor means interconnecting the contact means on said one section of the first switch means and the contact means mounted for movement with said one section of the first switch means.

2. The device of claim 1 including holding means engaging the switch sections carrying the first and third mentioned contact means to prevent their movement as the associated second and fourth mentioned contact means, respectively, move relative thereto.

3. A multistage variable impedance device comprising: a support, first switch means including a pair of relatively movable sections, first impedance means mounted on one section of the first switch means, contact means mounted on the other section of the first switch means for selective engagement with the first impedance means, operating means mounted for movement relative to the support and connected to one section of the first switch means, means releasably interengaging the pair of sections of the first switch means for maintaining said sections in relative fixed position after a predetermined movement of the section connected to the operating means, second switch means including a section mounted independently of the relative movement of the sections of the first switch means, second impedance means mounted on said independently mounted section of the second switch means, contact means mounted for movement with the section of the first switch means carrying the first impedance means and arranged for selective engagement with the second impedance means, and conductor means interconnecting the first impedance means and the said contact means mounted for movement therewith.

4. The device of claim 3 including holding means engaging the switch sections carrying the impedance means to prevent their movement as the associated contact means moves relative thereto.

5. The device of claim 3 wherein the first impedance means is a variable impedance, and the second impedance means comprises a plurality of fixed impedances connected together in series.

6. The device of claim 3 wherein the first impedance means is a variable impedance, the second impedance means comprises a plurality of fixed impedances connected together in series, and the contact means mounted for movement with the section of the first switch means carrying the first impedance means comprises a pair of spaced contact elements connected to opposite ends of the first impedance and so positioned with respect to the individual second impedances that the value of the second impedance shunted by the first impedance is at least equal to the maximum value of said first impedance.

7. The device of claim 3 wherein the first impedance means is a variable impedance, the second impedance means comprises a plurality of fixed impedances connected together in series, the contact means mounted for movement with the section of the first switch means carrying the first impedance means comprises a contact element, and the conductor means connects said contact element to one end of the variable impedance.

8. A multistage variable impedance device comprising: a support, first switch means including a pair of relatively movable sections, first impedance means mounted on one section of the first switch means, contact means mounted on the other section of the first switch means for selective engagement with the first impedance means, operating means mounted for movement on the support and connected to one section of the first switch means, means releasably interengaging the pair of sections of the first switch means for maintaining said sections in relative fixed position after a predetermined movement of the section connected to the operating means, second switch means including a fixed section mounted on the support and a section mounted for movement independently of the relative movement of the sections of the first switch means, second impedance means mounted on said fixed section of the second switch means, contact means mounted on the movable section of the second switch means and arranged for selective engagement with the second impedance means, means interconnecting the movable section of the second switch means and the section of the first switch means carrying the first impedance means, and conductor means interconnecting the first impedance means and the contact means on the movable section of the second switch means.

9. A multistage variable impedance device comprising: a support, first switch means including a pair of relatively movable sections, first impedance means mounted on one section of the first switch means, contact means, mounted on the other section of the first switch means for selective engagement with the first impedance means, operating means mounted for movement on the support and connected to one section of the first switch means, means releasably interengaging the pair of sections of the first switch means for maintaining said sections in relative fixed position after a predetermined movement of the section connected to the operating means, second switch means including a section mounted for movement independently of the relative movement of the sections of the first switch means, second impedance means mounted on said section of the second switch means, contact means mounted for movement with the section of the first switch means carrying the first impedance means and arranged for selective engagement with the second impedance means, conductor means interconnecting the first impedance means and the last named contact means, means releasably interengaging said movable section of the second switch means and the section of the first switch means carrying the first impedance means for moving said sections simultaneously after a predetermined movement of the section of the first switch means carrying the first impedance means, third switch means including a fixed section mounted on the support, third impedance means mounted on the fixed section of the third switch means, contact means mounted for movement with the section of the second switch means carrying the second impedance means and arranged for selective engagement with the third impedance means, and conductor means interconnecting the second impedance means and the last named contact means.

10. The device of claim 9 including holding means engaging the switch sections carrying the impedance means to prevent their movement as the associated contact means moves relative thereto.

11. The device of claim 9 wherein the first impedance means is a variable impedance, the second impedance means comprises a plurality of fixed impedances connected together in series, the third impedance means comprises a plurality of fixed impedances connected together in series, the contact means mounted for movement with the section of the first switch means carrying the first impedance means comprises a pair of spaced contact elements connected to opposite ends of the first impedance and so positioned with respect to the individual second impedances that the value of the second impedance shunted by the first impedance is at least equal to the maximum value of said first impedance, and the contact means mounted for movement with the section of the second switch means carrying the second impedance means comprises a pair of spaced contact elements connected to opposite ends of the second impedance and so positioned with respect to the individual third impedances that the value of the third impedance shunted by the second impedance is at least equal to the maximum value of said second impedance.

12. A multistage variable impedance device comprising: a support, first switch means including a pair of relative movable sections, first impedance means mounted on one section of the first switch means and having terminal ends, contact means mounted on the other section of the first switch means for selective engagement with the first impedance means, operating means mounted for movement relative to the support and connected to one section of the first switch means, means releasably interengaging the pair of sections of the first switch means for maintaining said sections in relative fixed position after a predetermined rotation of the section connected to the operating means, second switch means including a section mounted independently of the relative movement of the sections of the first switch means, second impedance means mounted on said independently mounted section of the second switch means and having terminal ends, and contact means connected electrically to at least one of the terminal ends of the first impedance means and mounted for movement with the section of the first switch means carrying the first impedance means and arranged for selective engagement with the second impedance means.

13. A multistage variable impedance device comprising: a support, first switch means including a pair of relatively movable sections, impedance means mounted on one section of the first switch means and having terminal ends, contact means mounted on the other section of the first switch means for selective engagement with the first impedance means, operating means mounted for movement relative to the support and connected to one section of the first switch means, means releasably interengaging the pair of sections of the first switch means for maintaining said sections in relative fixed position after a predetermined movement of the section connected to the operating means, second switch means including a section mounted independently of the relative movement of the sections of the first switch means, a plurality of second impedance means connected together in series and mounted on said independently mounted section of the second switch means, and spaced contact means connected to the opposite ends of the first impedance means and mounted for movement with the section of the first switch means carrying the first impedance means and arranged for selective engagement with the second impedance means in such manner as to place the first impedance means in shunt with at least one of the series connected second impedance means.

14. A multistage variable impedance device comprising: a support, first switch means including a pair of relatively movable sections, first impedance means mounted on one section of the first switch means and having terminal ends, contact means mounted on the other section of the first switch means for selective engagement with the first impedance means, operating means mounted for movement on the support and connected to one section of the first switch means, means releasably interengaging the pair of sections of the first switch means for maintaining said sections in relative fixed position after a predetermined movement of the section connected to the operating means, second switch means including a section mounted for movement independently of the relative movement of the sections of the first switch means, second impedance means mounted on said section of the second switch means and having terminal ends, contact means connected electrically to at least one end of the first impedance means and mounted for movement with the section of the first switch means carrying the first impedance means and arranged for selective engagement with the second impedance means, means releasably interengaging said movable section of the second switch means and the section of the first switch means carrying the first impedance means for moving said sections simultaneously after a predetermined movement of the section of the first switch means carrying the first impedance means, third switch means including a fixed section mounted on the support, third impedance means mounted on the fixed section of the third switch means and having terminal ends, and contact means connected electrically to at least one of the terminal ends of the second impedance means and mounted for movement with the section of the second switch means carrying the second impedance means and arranged for selective engagement with the third impedance means.

15. A multistage variable impedance device comprising: a support, first switch means including a pair of relatively movable sections, first impedance means mounted on one section of the first switch means and having terminal ends, contact means mounted on the other section of the first switch means for selective engagement with the first impedance means, operating means mounted for movement on the support and connected to one section of the first switch means, means releasably interengaging the pair of sections of the first switch means for maintaining said sections in relative fixed position after a predetermined movement of the section connected to the operating means, second switch means including a section mounted for movement independently of the relative movement of the sections of the first switch means, a plurality of second impedance means connected together in series and having terminal ends and mounted on said section of the second switch means, spaced contact means connected electrically to the terminal ends of the first impedance means and mounted for movement with the section of the first switch means carrying the first impedance means and arranged for selective engagement with the second impedance means in such manner that the first impedance means is placed in shunt with at least one of the series-connected second impedance means, means releasably interengaging said movable section of the second switch means and the section of the first switch means carrying the first impedance means for moving said sections simultaneously after a predetermined movement of the section of the first switch means carrying the first impedance means, third switch means including a fixed section mounted on the support, a plurality of third impedance means connected together in series and mounted on the fixed section of the third switch means, spaced contact means connected electrically to the terminal ends of the second switch means and mounted for movement with the section of the second switch means carrying the second impedance means and arranged for selective engagement with the third impedance means in such manner that the second impedance means is placed in shunt with at least one of the series-connected third impedance means.

References Cited in the file of this patent

UNITED STATES PATENTS

| | | |
|---|---|---|
| 2,561,140 | Schaefer | July 17, 1951 |
| 2,625,632 | Onia et al. | Jan. 13, 1953 |
| 2,670,422 | Baum et al. | Feb. 23, 1954 |
| 2,707,222 | Brown et al. | Apr. 26, 1955 |
| 2,729,727 | Malloy et al. | Jan. 3, 1956 |

Disclaimer 2,884,505.—*Douglas C. Strain*, Portland, and *Lawrence R. Rockwood*, Oswego, Oreg. VARIABLE CONTROL FOR ELECTRICAL IMPEDANCE ASSEMBLIES. Patent dated Apr. 28, 1959. Disclaimer filed Feb. 9, 1966, by the assignee, *Electro Scientific Industries, Inc.*

Hereby enters this disclaimer to claims 1 through 15 of said patent.
[*Official Gazette May 31, 1966.*]